Figure 1:
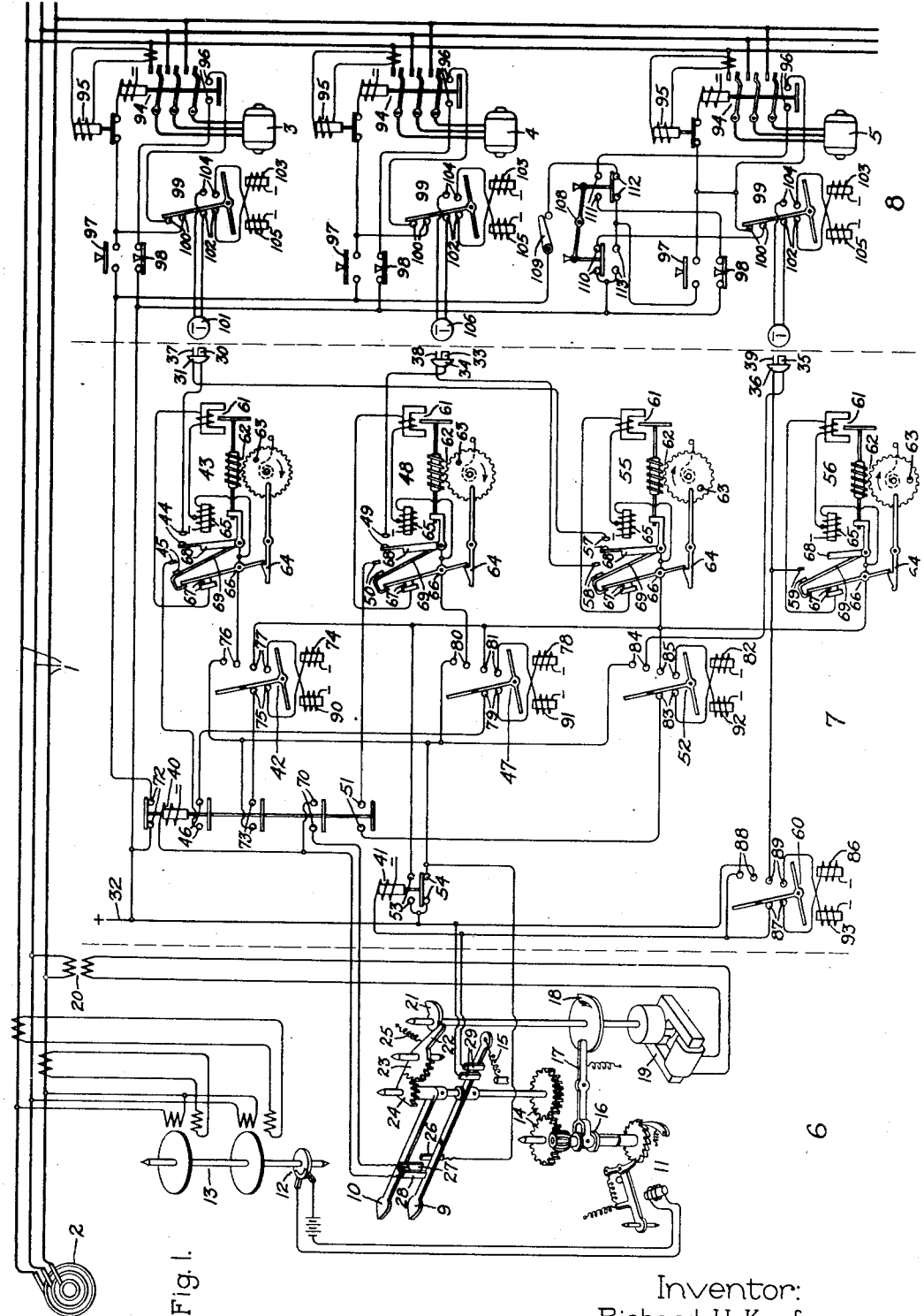

May 15, 1934.　　　R. H. KAUFMANN　　　1,959,166
ELECTRICAL REGULATING SYSTEM
Filed Aug. 1, 1933　　　2 Sheets-Sheet 1

Inventor:
Richard H. Kaufmann,
by Harry E. Dunham
His Attorney.

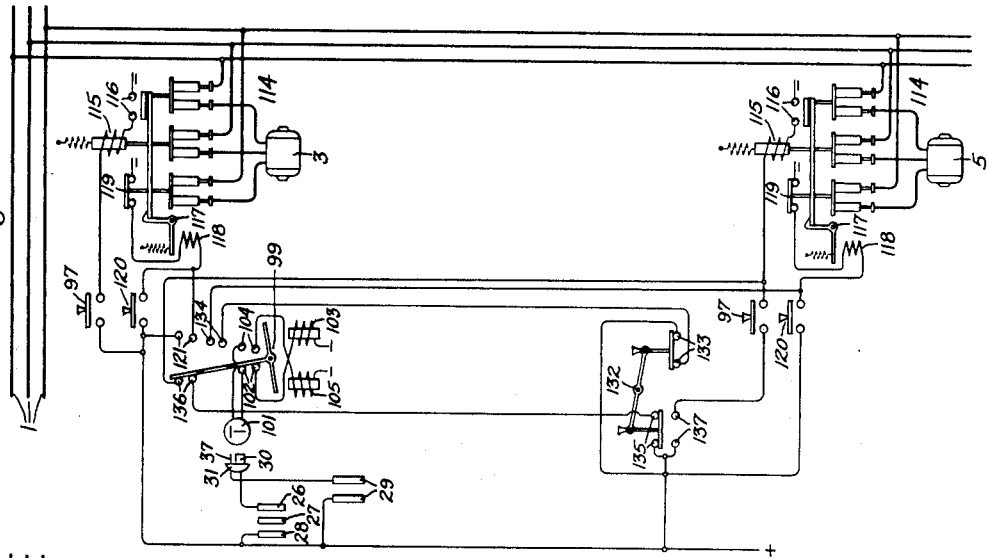

Patented May 15, 1934

1,959,166

UNITED STATES PATENT OFFICE 1,959,166

ELECTRICAL REGULATING SYSTEM

Richard H. Kaufmann, Schenectady, N. Y., assignor to General Electric Company, a corporation of New York Application August 1, 1933, Serial No. 683,139

8 Claims. (Cl. 171—97)

My invention relates to electrical regulating systems and more particularly to automatic electrical load regulating systems.

In accordance with my invention in one of its more refined embodiments, I employ main parts, namely, a master controller which is responsive to the load on a regulated circuit, a sequentially operating relay system under the control of the master controller, and individual control equipment for a plurality of load increments, which are energized from the regulated circuit, under the control of the relay system. Each of these three main parts is capable of general application and may either be useful in itself or in combination with various different other parts or systems. Consequently, although the specific embodiment of my invention which is disclosed herein is a load-regulating system of the type known as an automatic electrical power-demand regulating system, it should be understood that my invention is not necessarily limited to such a system.

By an automatic electrical power-demand regulating system I mean a load-regulating system of the type which automatically limits the total energy which can be taken from a circuit, or which can be supplied by such a circuit, in a given period of time, which period is known in the art as the demand interval. In other words, instead of automatically limiting the instantaneous value of the power flow in the circuit, such as in the case with an ordinary overload-regulating system, my system integrates the energy flow in a load circuit and automatically prevents the energy flow from exceeding a predetermined value in a predetermined time, after which time the system begins integrating energy flow again for another similar period of time.

In accordance with my invention I provide a novel automatic power-demand limiting system which operates to control the application to, and removal from, an electric power circuit of a plurality of load increments in such a way as to regulate the maximum power demand on the circuit and thereby prevent the establishment of a new and higher maximum demand on the circuit.

An object of my invention is to provide a new and improved electrical load-regulating system.

Another object of my invention is to provide a new and improved system of power demand regulation in which regulation takes place during the latter part of the demand interval in such a manner as to sequentially remove enough load increment to prevent the establishment of a new maximum demand.

A further object of my invention is to provide a load-regulating system of the type which controls a plurality of load increments with means for easily and selectively varying the order of the control of said increments.

An additional object of my invention is to provide an arrangement for permitting the seselective manual or automatic control of load increments.

A still further object of my invention is to provide a novel sequence-operating relay system for load-regulating systems.

My invention will be better understood from the following description taken in connection with the accompanying drawings and its scope will be pointed out in the appended claims.

In the accompanying drawings, in which like reference characters designate like elements throughout the several views, Fig. 1 is a schematic view of a preferred embodiment of my invention; Fig. 2 illustrates a modification employing circuit breakers instead of contactors as in Fig. 1; Fig. 3 illustrates a modification for direct control of the load increments from the master controller; while Fig. 4 is similar to Fig. 3, but differs therefrom in that the connections of the load increments to the main circuit are made by circuit breakers instead of by contactors as in Fig. 3.

Referring now to Fig. 1 of the accompanying drawings, I have shown my demand-regulating system as applied to an electric circuit 1, illustrated by way of example as a three-phase alternating-current power circuit, which receives energy from a generator 2, and which is adapted to supply energy to a plurality of load increments, illustrated by way of example as motors 3, 4, and 5. As previously stated, my system as illustrated consists of three parts, and these parts are shown in the drawings as being separated by dashed lines and comprise the master controller 6, the relay system 7, and the individual control 8 for the load increments.

Proceeding now with a detailed description of the master controller 6, this device consists essentially of a pair of pointers or contact-carrying arms 9 and 10, which are known respectively as the energy arm and the time arm. In practice these pointers may be provided with a conventional scale calibrated in kilowatt hours, such as is customary in the demand meter art. Energy contact 9 is adapted to be driven at a rate of speed which is proportional to the instantaneous power flow in circuit 1 in any suitable manner. As shown, it is driven in a well known way by means of a step-by-step mechanism 11 which is energized periodically from a commutator arrangement 12 on the shaft of a conventional watthour meter 13 which is connected to respond to the power flow in circuit 1 in the conventional manner. The step-by-step mechanism 11 is mechanically connected to the pointer 9 through a suitable gear train 14. A spring 15, or other suitable biasing means, serves to bias energy arm 9 in a clockwise direction and the step-by-step actuating mechanism of this arm is arranged to operate the arm in a counterclockwise direction. Arm 9 is periodically reset to its original starting position by means of a suitable timing mechanism which operates periodically to break the driving connection between the actuating mechanism 11 and the gear train 14. This mechanism comprises a clutching arrangement consisting of a slidable collar 16 which is attached to one of the gears of the train 14 and which may be slid down on the shaft of the driving mechanism 11 far enough to permit disengagement of this gear with the other gear of the train 14. The collar 16, although slidable on the shaft of the actuating mechanism 11, is relatively non-rotatable therewith through the provision of a flat side on the shaft of the mechanism 11. The collar 16 is periodically slid down on the shaft of mechanism 11 by means of a pivotally mounted arm or yoke 17, which is periodically actuated by a cam 18, which is driven by any suitable timing device, the device illustrated being a small synchronous motor 19 of the type commonly employed in electric clocks, which motor is connected to the circuit 1 through a potential transformer 20. As most present day power systems have their frequency regulated for the purpose of distributing accurate time to secondary electric clocks, it will be assumed that the frequency of circuit 1 is so regulated, and consequently the speed of motor 19 will be constant and this motor will be the equivalent of a chronometer or clock.

Also arranged to be operated by motor 19 is another cam 21 which has a follower 22 which forms part of a mutilated gear 23 engaging another mutilated gear 24, which is fastened to the ideal or time pointer 10. This time pointer 10 periodically moves counter-clockwise for a given distance and then is reset to its starting position, whereupon it again commences a counter-clockwise motion. The time period of the pointers 10 and 9 are the same, due to the fact that they are both operated by cams on the shaft of motor 19. A suitable biasing means, such as a spring 25, serves to restore pointer 10 and hold the cam follower 22 against cam 21.

If the starting position of time pointer 10 is taken as zero watt-hours and if the extreme position of its movement is taken as the maximum demand of the circuit in watt-hours, and if the cam arrangement is so designed that the pointer 10 moves at a constant speed, the motion of this pointer corresponds to the expenditure of energy in circuit 1 at an ideal rate during the demand interval in that at the end of this interval an amount of energy exactly equal to the maximum demand and no more has been used. If now the energy pointer 9 is arranged so that its starting position corresponds to the starting position of the time pointer 10, the energy pointer 9 cannot be ahead of the time pointer 10 at the end of the demand interval without the occurrence of a new maximum demand in circuit 1. The pointer 9 may advance more rapidly than the pointer 10 during the early part of the demand interval and may thereafter advance more slowly, but in no case can the pointer 9 be ahead of the pointer 10 at the end of the demand interval without indicating that the desired maximum demand has been exceeded.

By arranging suitable circuit-controlling means to be controlled jointly by the arms 9 and 10, it is possible to initiate control impulses or to complete control circuits which will automatically limit the load demand on the circuit 1 whenever the pointer 9 catches up to the pointer 10, or tends to pass this pointer. By arranging the pointers 9 and 10 so that when they are reset the time pointer 10 has a head start, or given angular advance, with respect to the energy pointer 9, it will be possible for energy to be used in circuit 1 at a rate which is considerably higher than the ideal rate for the early part of the demand interval because during this interval the energy pointer 9 can be advancing at a greater speed than the time pointer 10, whereby it will be catching up to the time pointer but it will not yet have passed this pointer. However, as soon as the energy arm tends to pass the time pointer the circuit control will be actuated thereby to cause removal of load, which in turn will cause a slowing up of the energy pointer so that if enough load is removed the energy pointer will slow up to the same speed as the time pointer and will be prevented from passing the latter, thereby establishing a new maximum demand at the end of the demand interval.

One suitable circuit-controlling arrangement is that illustrated and comprises a contact 26 on the energy pointer 9 and a pair of insulated and relatively spaced flexible contacts 27 and 28 carried on the time pointer 10. These contacts are so arranged that when pointer 9 catches up to pointer 10, contact 26 will engage contact 27 and if the energy pointer 9 continues to advance with respect to the time pointer 10 the flexible contact 27 will be flexed, thereby engaging contact 28 so that all three contacts will be in engagement. As will be explained later in more detail, the purpose of this triple contact arrangement is to prevent intermittent operation of the relay system or load limiting features of my invention due to vibration or intermittent engagement of the contacts 26 and 27, provided they were used alone to control the automatic removal of load.

In addition to the contacts 26, 27, and 28, the master controller is also provided with a set of contacts 29 which are arranged to be closed when the pointers are reset to their starting position. These contacts may be operated in any suitable manner and as shown they are arranged to be bridged by an extension on the energy pointer 9 when the latter is reset to its starting position.

As will be explained more in detail hereinafter, the relay system 7 responds to the closing of contacts 26, 27, and 28 in such a way as substantially instantaneously to connect a contact 30 of a quick detachable type connector, such as a plug connector 31, to one side 32 of a suitable source of current supply and thereafter in time delayed sequence to make the same connection to a contact 33 of another quick detachable connection plug 34 and to a contact 35 of a third plug 36. The source of current supply is preferably an alternating-current source, but for convenience of description and time of circuits the side 32 thereof will be termed the positive side and the other side the negative side. As will be explained later in connection with the description of the individual control arrangement 8, these connections to the contacts 30, 33, and 35 serve to initiate the removal or disconnection of the load increments 3, 4, and 5 from the circuit 1 in time delayed sequence. In addition to the above operation, the relay system 7 also responds to the closing of the contacts 29 at the end of the demand interval to connect a contact 37 of plug 31 to the positive side of the control source substantially instantaneously and thereafter to connect a contact 38 of plug 34 to this source and a contact 39 of plug 36 to this source in time delayed sequence. As will also be explained later in connection with the arrangement and operation of part 8, this operation of the relay system 7 serves to restore automatically the load increments 3, 4, and 5 to the circuit 1 in time delayed sequence.

Before tracing the circuits of relay system 7 in detail, its principal parts and general operation will now be described. This system has two primary relays 40 and 41, which are under the control respectively of overpower closing contacts 26, 27, and 28, and restoring contacts 29. The closing of relay 40 establishes a circuit, which will be traced hereinafter, causing a relay 42 to change over to the opposite position from that shown in the drawing and this operation of relay 42 controls the energization of a time delay relay 43. Time delay relay 43 has a pair of instantaneously closing contacts 44 which serve to make the final connection between the supply source 32 and the contact 30 of plug 31. Time delay relay 43 also has a pair of time delay closing contacts 45 which close in a predetermined time after this relay is energized and which are in series with a pair of contacts 46 on relay 40 which close when this relay is energized, and the closure of contacts 45 and 46 completes a circuit for energizing a relay 47 similar to relay 42. Operation of relay 47 to the other position from that shown in the drawings serves to energize a time delay relay 48 which is similar to relay 43. Time delay relay 48 has a pair of instantaneously closing contacts 49 which serve to energize the contact 33 of plug 34. Relay 48 also has a pair of time delay closing contacts 50 which, when closed, complete a circuit in series with a pair of contacts 51 on relay 40 similar to the contacts 46 on this relay, and the circuit including contacts 50 and 51 serves to energize a relay 52 similar to relays 42 and 47 and cause this relay to assume the opposite position from that shown in the drawings. The operation of relay 52 to this position completes a circuit to the contact 35 of plug 36.

Operation of relay 41 in response to closure of contacts 29, causes this relay to close a set of contacts 53 and to open a set of contacts 54. Opening of contacts 54 prevents energization of relays 42, 47, and 52 to cause them to assume the opposite position to that shown in the drawings, while closing of contacts 53 causes the simultaneous restoration of relays 42, 47, and 52 to the position shown in the drawings. At the same time closure of contacts 53 causes the simultaneous energization of a pair of time delayed operating relays 55 and 56 which are similar to relays 43 and 48. Relay 55 has a pair of instantaneously closing contacts 57 which serve to complete a circuit to the contact 37 of plug 31. Relay 55 also has a pair of time delayed closing contacts 58 which close in a predetermined time after the relay 55 is energized and which complete a circuit to the contact 38 of plug 34. Time delay relay 56 has a pair of time delayed closing contacts 59 which serve to complete an energizing circuit for the contacts 39 of plug 36.

In addition to relay 41, the resetting contacts 29 of the master controller 6 also control a relay 60 which is similar in general type to the relays 42, 47, and 52. This relay is connected in parallel with relay 41 so that upon the closure of contacts 29, relays 41 and 60 will simultaneously be operated and relay 60 will move to the opposite position from that shown in the drawings. The restoration of relay 60 is accomplished by the closing of contacts 59 of time delayed relay 56, which contacts close a circuit in parallel to the circuit for contact 39 and which parallel circuit serves to energize a restoring coil for relay 60.

This completes in a general way the description of the arrangement and operation of the relay system 7. Before giving a detailed description of the various circuits of the system, the construction and operation of the time delay relays 43, 48, 55, and 56 will be described in detail. These four relays are similar in construction and operating principle and consequently only relay 43 will be described in detail, and the reference characters for the various operating elements of this relay will be applied to the similar elements of the other time delay relays.

Relay 43, which is of a type which is old in the art, consists essentially of a motor 61 which is connected by means of a worm gear arrangement 62 to control a timing mechanism consisting essentially of a pin 63 for tripping a latch 64. An electromagnet 65 controls the mechanical driving connection between the motor 61 and the gear arrangement 62. The arrangement is such that if a source of current supply is connected to a pivoted latch contact member 66, current will flow therefrom through two parallel paths, one of which contains the electromagnet 65 which, as shown, has its free terminal connected to the negative side of the control source 32. The other parallel path includes a pair of contacts 67 in series with the winding of motor 61, the combination being connected across a section of the electromagnet coil 65, the latter functioning as an autotransformer. The energization of the electromagnet 65 causes the attraction of a pivoted combination armature member and contact member 68 which serves the double purpose of closing contacts 44 and causing the engagement of the gears 62 whereby the motor will drive the gears and cause the pin 63 to rotate in a counter-clockwise direction toward a position in which it will trip the latch 64. After a predetermined time of operation the pin 63 will trip the latch 64 which operation will allow the contacts 67 to be snapped open by a spring member 69 which is fastened to the armature member 68 and which is put under stress when the electromagnet 65 attracts the armature member 68. Also carried by spring member 69 is one of the contacts 45 which contacts will close when the latch 64 is tripped. The opening of the contacts 67 breaks the motor circuit so that further operation of the relay 43 is prevented until the relay has been deenergized, that is to say, until the electromagnet 65 is deenergized. When this magnet is deenergized the armature 68 will be restored to the position shown in the drawings, thereby disengaging the gears 62, whereupon the gear carrying the pin 63 will be restored to the position shown by a suitable spring, and the members 64, 66, and 69 will return to the positions shown in the drawings and the relay will be ready for another operation.

A detailed description of the circuits and operation of the relay system 7, as controlled by master controller 6, is as follows: Assume that energy arm 9 of the master controller 6 catches up to the time arm 10 and that consequently contact 26 engages contact 27. With the mere engagement of these two contacts nothing more will happen, but the fact that arm 9 has caught up to arm 10 indicates that it is moving at a faster rate than arm 10 and consequently, unless the load on circuit 1 decreases, arm 9 will continue to advance with respect to the arm 10 and contact 27 will be flexed into engagement with contact 28. As soon as this happens a circuit is established from the positive side of the control source 32 through contacts 54 of relay 41, contacts 26, 27, and 28, and back to the negative side of the supply source through the actuating winding of relay 40. Consequently, this relay becomes actuated and its actuation causes the closing of a pair of contacts 70 thereon and these contacts are so connected as to cause completion of an electrical connection between the contacts 27 and 28. Consequently, if the speed of arm 9 falls below the speed of arm 10 and contacts 27 and 28 separate, the relay 40 will continue to remain energized until the contact 27 leaves the contact 26 at which time relay 40 will be deenergized. During the time that contacts 27 and 28 are disengaged, the energizing circuit for relay 40 will be from the positive side of the supply source through contacts 54, contact 26 to contact 27, thence through the contacts 70 to the operating winding of relay 40. The purpose of the contact arrangement 26, 27, and 28, and the contacts 70 on relay 40 is to prevent vibratory or chattering action of the relay 40, which might otherwise take place due to vibration of the master controller 6 or to rapid load fluctuations which would cause intermittent making and breaking of but a single pair of contacts carried respectively by the pointers 9 and 10.

Relay 40 also has a set of normally closed contacts 72 which are opened upon actuation of this relay and the purpose of these contacts will be explained more fully hereinafter in connection with the explanation of the arrangement and operation of the individual control 8 for the load increments.

Relay 40 has another set of contacts 73 which are normally opened and which are closed by the actuation of this relay. The closure of contacts 73 completes an energizing circuit for an actuating winding 74 on relay 42 through a pair of contacts 75 on this relay. This circuit can be traced from the positive side of the source 32 through the contacts 54 of relay 41, through the contacts 73 and 75 in series, and back to the other side of the source through the winding 74. Consequently, as soon as the relay 40 is actuated, the relay 42 will be actuated, thereby to close two sets of contacts 76 and 77, respectively. The closure of contacts 76 will energize the time delay relay 43 through a circuit including the contacts 54 and 76 in series. As has been explained previously, the energization of time delay relay 43 causes the immediate closure of contacts 44 thereby to connect the contact 30 of plug 31 to the positive side of the supply source through a circuit including contacts 54, 76, and 44 in series. As has already been stated, and as will be described more clearly hereinafter, the energization of contact 30 causes the apparatus 8 to remove the load increment 3 from circuit 1. After a predetermined time, depending upon the setting of relay 43 and, for example, about one minute for a thirty-minute demand interval, contacts 45 of relay 43 will close, thereby completing a circuit for an operating winding 78 of relay 47, as follows: Namely, from the positive side of the supply source, through contacts 54 of relay 41, contacts 76 of relay 42, contacts 45 of relay 43, contacts 46 of relay 40, and a pair of contacts 79 of relay 47. The operation of relay 47 closes two pairs of contacts 80 and 81 thereon, and the closure of contacts 80 energizes time delay relay 48 through contacts 54 and 80 in series. The energization of relay 48 closes its contacts 49, thereby energizing contact 33 of plug 34 and after a predetermined time, such for example as one minute, contacts 50 of relay 48 will close, thereby establishing an energizing circuit for an operating winding 82 on relay 52, as follows: Contacts 54, 80, 50, 51 on relay 40 and a pair of contacts 83 on relay 52. The energization of relay 52 closes two pairs of contacts 84 and 85 thereon, and the closure of contacts 84 connects the contact 35 of plug 36 to the positive side of the supply source through contacts 54 of relay 41 and contacts 84 of relay 52 in series.

At the end of the demand interval the contacts 26, 27, and 28 will separate and the contacts 29 will close. The closure of contacts 29 causes the simultaneous energization of relays 41 and 60, and the opening of contacts 26, 27, and 28 causes the deenergization of relay 40. Relay 60 is energized on the closure of contacts 29 by an operating winding 86 through a set of contacts 87 thereon. Operation of relay 60 closes sets of contacts 88 and 89 thereon, and contacts 88 are connected in parallel with contacts 29 whereby the energizing circuit for relay 41 is maintained closed after contacts 29 open due to the normal operation of the contact-making demand meter 6. The operation of relay 41 closes its contacts 53 and opens its contacts 54. The closure of contacts 53 causes the simultaneous restoration of the three relays 42, 47, and 52 to the position shown in the drawings through contacts 77, 81, and 85, whereby windings 90, 91, and 92 respectively thereon are energized. The opening of contacts 54 prevents any further energization of the contacts 30, 33, and 35 of plugs 31, 34, and 36, respectively. The closing of contacts 53 also causes the simultaneous energization of the time delay relays 55 and 56. Relays 55 and 56 have different, relatively short, time settings; for example, relay 55 may be so set that its contacts 58 will close in about one second or a fraction thereof, whereas relay 56 will close its contacts 59 in between one or two seconds. As explained previously in connection with the general description of the operation of the relay system 7, the closure of immediately-closing contacts 57 of relay 55 energizes the contact 37 of plug 31, while the time delayed closing of contacts 58 energizes the contact 38 of plug 34. Shortly thereafter relay 56 will close its contacts 59, thereby energizing contact 39 of plug 36 and at the same time a circuit will be established through contacts 53, 59, and 89 to a restoring winding 93 on relay 60, whereby this relay is restored to its position shown in the drawings, thereby separating its contacts 88 and deenergizing the relay 41. This takes the relay system 7 through its entire cycle of operation and returns the various elements to the positions shown in the drawings.

Turning now to a description of the individual load increment control 8, each of the load increments 3, 4, and 5 has its connection to, and disconnection from, power circuit 1 controlled by similar contactors 94 which are controlled by overload relays 95 connected to be responsive to the load on the individual load increment. Each of the contactors 94 is provided with a set of auxiliary contacts 96. Each of the load increments 3, 4, and 5 is also provided with a push-button station comprising a start button 97 and a stop button 98, and each of the load increments is also provided with a similar relay 99.

For manual control of motor 3, the closure of the start button 97 completes a circuit from the positive side of the control circuit through contacts 72 of relay 40 and the contacts of the overload relay 95 to energize the contactor 94, thereby connecting motor 3 to the circuit 1. As soon as the contactor 94 is actuated, its auxiliary contacts 96 close, thereby completing a circuit from the positive side of the supply source through stop button 98, the back contacts 96, a set of contacts 100 on relay 99, and the contacts of the overload relay 95. This circuit constitutes a holding circuit for maintaining the contactor 94 energized and the motor 3 connected to the power circuit. When it is desired to stop the motor 3 manually, the stop button 98 is pushed, thereby breaking this holding circuit and causing the contactor 94 to drop out.

Under automatic operation the relay 99 is controlled from the plug 31 by connecting it thereto through a complementary socket member 101. Thus, when contact 30 of plug 31 is energized, a circuit is completed through a set of contacts 102 on relay 99 and an actuating coil 103 thereon. This causes actuation of the relay 99 whereby contacts 100 and 102 thereon are broken and a set of contacts 104 thereon are closed. If motor 3 has been operating, the breaking of the holding circuit for its contactor 94 through the opening of the contacts 100 will cause the contactor to drop out and disconnect the motor 3 from the power circuit. When the contact 37 of plug 31 is energized, a circuit is established through contacts 104 for energizing a restoring coil 105 on the relay 99 whereby this relay is restored to its position illustrated in the drawings. However, there is no provision for automatic reconnection of motor 3 to the power circuit, and the reclosing of the contacts 100 will not cause this reconnection due to the fact that when the contactor 94 drops out its auxiliary contacts 96 open and these contacts cannot be closed again until the manual start button 97 is actuated.

From the above it will be seen that motor 3 can only be started by actuation of the start button 97 and even then it can only be started if relay 40 is deenergized; that is to say, if its contacts 72 are closed, and this condition only exists during times when the total load on circuit 1 is not so high as to cause a too close approach to the maximum demand. It will also be seen that motor 3 can be stopped in three ways, and three ways only; namely, manually by the operation of the stop button 98, and automatically either by the operation of the overload relay 95, or by the operation of the relay 99 opening its contacts 100.

The control system for motor 4 is identical with that for motor 3, except that its relay 99 is connected to plug 34 by means of a socket member 106 similar to socket member 101.

The control for motor 5 differs mainly from the control for the motors 3 and 4 in that a two-position snap switch 108 is provided for making it possible to secure selectively either complete manual control of the starting and stopping of the motor 5, or complete automatic control of the starting and stopping of this motor. In addition, a circuit connection including a manual switch 109 is provided whereby it is additionally possible to secure manual starting under the same conditions as manual starting for motors 3 and 4 along with the automatic starting.

With snap switch 108 in the position shown and with switch 109 open, the control of motor 5 is completely automatic and is solely under the control of contacts 100 of relay 99. Thus, if the main control source 32 is energized the contactor 94 will be energized from this source through a set of closed contacts 110 on switch 108, then through contacts 100 of relay 99, the contacts of overload relay 95 to the operating coil of contactor 94, thereby closing this contactor and causing operation of motor 5. If now contact 35 of plug 36 is energized by the relay system 7 and assuming that plug 36 is in engagement with its complementary socket member, similar to members 101 and 106, the relay 99 will be actuated to its other position thereby opening its contacts 100 and breaking the energizing circuit for contactor 94, whereby this contactor drops out and stops the motor 5. It will be seen that start button 97 has no control because the energizing connection for this button is through the open switch 109. Similarly, the stop button 98 has no control because its circuit is broken by means of a pair of open contacts 111 on the snap switch 108. If now switch 109 is closed it is possible to have manual starting of the motor 5 because then a circuit is completed through the contacts 72 of relay 40, switch 109, a set of contacts 112 on switch 108, the button 97, the contacts of overload relay 95, and the operating winding of contactor 94. However, this manual starting is limited in application because in the first place the manual starting circuit can only be completed when contacts 72 of relay 40 are closed; that is to say, when the power demand conditions on circuit 1 are such as not to tend to produce a new maximum demand, and in the second place, there is no holding circuit so that it is necessary to hold the starting button 97 closed in order to continue operation of the motor 5. Soon after the beginning of a new demand interval, contact 39 of plug 36 will be energized, thereby restoring relay 99 to the position shown whereby motor 5 is automatically restarted through the closing of contacts 100.

When switch 108 is snapped to its other position it closes contacts 111 and an additional set of contacts 113, and opens contacts 110 and 112, thereby completely incapacitating the automatic control as well as the limited manual control and providing for complete manual control entirely independent of any automatic feature. Thus the start button 97 when closed completes a circuit through contacts 113 of the switch 108 and this circuit is energized directly from the supply circuit 32 so that manual starting can be had at any time regardless of the power demand conditions on circuit 1. As soon as contactor 94 picks up, a holding circuit is completed through the back contacts 96, closed contacts 111 on switch 108, through the stop button 98 and back to the supply circuit 32. Manual stopping is obtained by pushing the stop button 98 which breaks the holding circuit and causes the contactor 94 to drop out. Due to the opening of the contacts 110 of switch 108 the automatic control feature is entirely inoperative.

Although the selective switch 108 has been shown as applied only to the control for motor 5, it will be obvious to those skilled in the art that if desired this feature may also be incorporated in the control of either motor 3 or motor 4, or both.

It should also be stated that, although the source of control current for the various relays has been illustrated as a direct-current source, by the plus and minus symbols, for purposes of ease of description, it should be noted that ordinarily it is preferable to utilize an alternating-current source of supply for these systems, because it is then possible to utilize small synchronous motors for the timing relays and due to the frequency regulated characteristics of most present-day commercial alternating-current circuits, this will give accurate timing of the time delay relay. However, when necessary, a direct-current control source utilizing direct-current operated timers may be used.

By means of the quick detachable plug and socket connections between the relay system 7 and the unit controllers 8, it is possible easily and selectively to vary the sequence of removal and restoration of the load increments 3, 4 and 5 from the circuit 1. Thus, for example, sockets 101 and 106 may be interchanged so that socket 101 engages plug 34 and socket 106 engages plug 31. With such a change motor 4 will be removed first and will be followed by motor 3 instead of as originally described. Similarly, any desired sequence may be obtained by suitably connecting the plugs and sockets.

The complete operation of the entire system illustrated in Fig. 1 should now be readily understood. Briefly stated, it is such that whenever the integrated energy flow in circuit 1 is so high that energy pointer 9 catches up to time, or ideal, pointer 10, circuits will be established which will cause load increment 3 to be removed from the circuit, and if this reduction in load is not sufficient to cause arm 9 to lag behind arm 10, an additional increment 4 will be removed in a predetermined time, and if this additional removal of load is not sufficient to cause separation of the contacts of demand meter 6 the load increment 5 will be removed in another predetermined time. Although only three load increments have been shown and described, it will of course be obvious to those skilled in the art that my system may be extended indefinitely to control any desired number of load increments.

At the end of the demand interval, the load increment 5 is restored automatically, provided of course that it has been removed, and if the increments 3 and 4 are provided with the automatic restoration features, the restoration will be in rapid sequential order. The purpose of this sequential order is to prevent a too sudden load application to the power circuit 1.

In the modification shown in Fig. 2, the motors 3 and 5 are arranged to be connected to the power circuit, and to be disconnected therefrom, by means of oil circuit breakers 114 instead of by contactors, as in Fig. 1. These circuit breakers 114 are provided with reclosing means 115 which are energized through a set of auxiliary contacts 116 which are closed when the circuit breaker is open, and which open when the circuit breaker closes. Circuit breakers 114 are also provided with latch members 117 for holding them closed and with tripping coils 118 for tripping the latch 117, thereby to trip open the breaker 114. The tripping circuit for the tripping coil 118 is completed through a set of back contacts 119 carried by the circuit breaker and which are arranged to be closed when the breaker is closed and to open when the breaker opens. A start button 97 is provided and is connected in series with the reclosing coil 115 while a stop button 120 is provided which differs from the stop button 98 of Fig. 1, in that it is normally open instead of being normally closed.

In the operation of the control for motor 3 of Fig. 2, the stopping of the motor may either be manual or automatic, while the starting of the motor is manual only and can only be had when power demand conditions are within safe limits on the main circuit 1. Thus, as shown, the circuit breaker 114 is closed and motor 3 is assumed to be operating. If stop button 120 is depressed, a circuit is completed from the control source through the tripping coil 118 and the back contacts 119, thereby tripping open the breaker 114.

For the automatic tripping of breaker 114 the relay 99 is snapped to its other position when contact 30 of plug 31 is energized from the relay system 7, through a circuit including the contacts 102 of relay 99 and its operating coil 103. This causes the relay to close a set of contacts 121 thereon which are connected across the stop button 120 thereby to complete a circuit from the source of control current through the contacts 121 to the tripping coil, thereby tripping the breaker 114. As soon as the breaker trips, its contacts 119 open, thereby preventing a continuous waste of energy through the reclosing coil 118. Also, when the circuit breaker 114 trips open, its contacts 116 close so that when start button 97 is depressed, a circuit may be completed through the reclosing means 115, thereby to close the breaker 114 whereupon it will be latched in its closed position by latch 117.

The circuit breaker control for motor 5 of Fig. 2 differs from the similar control of motor 3 in that an additional set of contacts 122 have been added to the relay 99 and a two-position snap switch 123 has been added to the circuit connections. With this arrangement and with the snap switch in the position shown, the control of the circuit breaker 114 is both completely automatic and manual in a restricted sense. Thus, the circuit breaker may be tripped and reclosed automatically by the operation of relay 99. The circuit breaker may also be tripped manually at any time and may be reclosed manually at any time when the over power contacts 26, 27, and 28 of the contact-making demand meter are open. The circuit connections for this control are as follows: An automatic reclosing circuit for the breaker 114 is completed through a set of contacts 124 on switch 123, thence through the contacts 122 on relay 99, the reclosing coil 115 and the back contacts 116. However, as soon as the breaker recloses, the contacts 116 open for the reasons specified above in connection with the circuit breaker control of 3. An automatic tripping circuit for the breaker 114 is completed as follows: First, the relay 99 is snapped to its other position through the energization of contact 35 of plug 36, which energization completes a circuit through the contacts 102 of the relay and its operating coil 103. This closes contacts 121 of relay 99. Then a circuit is completed from the supply source through contacts 124, contacts 121, the tripping coil 118, and the auxiliary contacts 119. Thus, with switch 123 in the position shown, relay 99 controls automatically the starting and stopping of the motor 5. In addition manual stopping is provided by means of switch 120 as in the control of motor 3. Also manual reclosing is provided by means of switch 97 whose circuit is completed through a set of contacts 125 on switch 123. This circuit can only be energized when the contacts 72 of relay 40 of Fig. 1 are closed.

When switch 123 is snapped to its other position, the control of the circuit breaker 114 is entirely manual and no automatic control at all is provided. Thus the opening of contacts 124 breaks both the automatic control circuits through contacts 121 and 122. The manual tripping circuit remains unchanged but the changeover switch 123 closes a set of contacts 126 and opens contacts 125 which changes the connection for the manual reclosing circuit to make this circuit energizable directly from the control source instead of through the contacts 72 of relay 40. Consequently, manual reclosing may be had at any time regardless of the power demand conditions on the power circuit 1.

Fig. 3 illustrates a modification of my invention in which the control of the load increments is secured directly from the contacts of the contact-making demand meter. This is sometimes of advantage in applications where it is unnecessary or undesirable to provide sequential control of load increments. The resultant control of motor 3 is the same as the resultant control of motor 3 in Fig. 1. Thus, when contacts 26, 27, and 28 close, a circuit will be completed from the positive side of the control source through contacts 30 of plug 31, thence through contacts 102 of relay 99 to the operating coil 103. This causes the relay 99 to snap over, opening its contacts 100 and thereby breaking the holding circuit through the back contacts 96 of contactor 94 and allowing the contactor 94 to drop out provided it has been closed. In addition the holding circuit includes the contacts 98 of the stop button so that manual operation of the stop button also will secure manual tripping of the motor 3. Starting is entirely manual and is secured through the starting button 97.

At the end of the demand interval, the contacts 29 close thereby energizing the contact 37 of plug 31 which in turn completes a circuit through contacts 104 and coil 105 of relay 99, thereby restoring this relay to the position shown in the drawing, and making it possible to reestablish the holding circuit for the contactor 94 through the contacts 100 of relay 99. Thus, in this modification there is only manual starting plus selective manual or automatic tripping.

This arrangement may also be modified as shown in connection with the motor 5. This modification consists essentially in adding a two-position snap switch 127 which permits motor 5 to be selectively either completely automatically controlled or completely manually controlled. With the switch 127 in the position shown, it has a pair of contacts 128 closed and a pair of contacts 129 open. The contacts 129 control the current flow to the manual control buttons 97 and 98 so that as these contacts are open manual control is impossible. However, with the parts as shown in the drawing, automatic starting will take place through the following circuit: From the positive side of the supply source through a conductor 130, through the contacts 128 of relay 127, through an auxiliary set of contacts 131 on relay 99, thence through the contacts of overload relay 95, through the closing coil of contactor 94. Consequently, with relay 99 in the position shown, automatic starting takes place. If now the contacts 26, 27, and 28 of the master controller close, the relay 99 snaps over as has previously been described, thereby breaking its contacts 131 which in turn breaks the energizing circuit for contactor 94 allowing this contactor to drop out, thereby disconnecting motor 5 from the circuit. Hence, the control is completely automatic and depends on the position of relay 99 which in turn depends upon the condition of the contacts of the master controller. When contacts 29 of the master controller close, the relay 99 snaps back to the position shown in the drawing, thereby restarting the motor 5.

If now two-position snap switch 127 is put in the other position, its contacts 128 open, thereby preventing automatic operation, and its contacts 129 close thereby completing a circuit for the push buttons 97 and 98. If now manual start button 97 is pushed, the contactor closes and a holding circuit is completed through the stop button 98 and back contacts 96. When it is desired manually to stop the motor, stop button 98 is pushed thereby breaking the holding circuit which then is also opened by the back contacts 96 so that starting cannot again be had until the starting button 97 is pushed.

Fig. 4 differs from Fig. 3 principally in that circuit breakers are employed instead of contactors for controlling the connection of motors 3 and 5 to the power circuit. In this figure the relay 99 is controlled from the contacts of the demand meter in the same way as in Fig. 3 and a pair of contacts 121 thereon which correspond to the contacts 121 of the similar relay in Fig. 2 control the automatic tripping of the circuit breaker 114. Manual tripping is also provided by means of the push button 120 and manual reclosing is provided by the push button 97.

Motor 5 may also be controlled entirely automatically from relay 99 and a two-position snap switch 132 is provided for securing selective manual or automatic control of motor 5. In the position shown for this switch, the control is completely automatic, but in addition manual stopping is also provided by means of push button 120. The automatic control is secured as follows: When the relay 99 snaps over to the other position in responsive to the closing of contacts 26, 27, and 28, a circuit is established from the positive side of the control source through the contacts 133 of switch 132, thence through a set of contacts 134 on relay 99, through the tripping coil 118 and the contacts 119, thereby tripping the circuit breaker 114. When the relay 99 is restored to the position shown in the drawing by the closing of contacts 29, a reclosing circuit for breaker 114 is automatically established as follows: From the positive side of the supply source through a set of contacts 135 on the switch 132, through a set of contacts 136 on the relay 99, to the reclosing coil 115, and through the contacts 116. This automatically recloses the breaker 114 and starts the motor again.

When switch 132 is snapped to its other position, a set of contacts 137 is closed, thereby permitting manual reclosing of breaker 114 by means of switch 97. At the same time the contacts 133 and 135 of switch 132 are broken, thereby preventing automatic operation of the circuit breaker 114.

Although I have shown and described certain specific embodiments of my invention, it will be obvious to those skilled in the art that my invention is not limited thereto and consequently I aim to cover in the appended claims such changes and modifications as fall within the true spirit and scope of my invention.

What I claim as new and desire to secure by Letters Patent of the United States, is:

1. In combination, an electric circuit, a plurality of electric power translating devices connected thereto, a time controlled element, an element controlled by the power flow in said circuit, and means operative in response to said elements having a predetermined relation for successively changing the power translated by said devices.

2. In combination, an electric circuit, a plurality of load increments connected thereto, a time controlled element, an element controlled by the power flow in said circuit, and means under the joint control of said elements for successively removing said load increments from said circuit when there is a predetermined relation between said elements.

3. In combination, an electric power circuit, a plurality of load increments connected to receive power from said circuit, a power-demand controller connected to be energized from said circuit and having simultaneously and periodically reset time and energy elements movable in the same general direction, said time element being reset a predetermined distance ahead of said energy element, and electrical means responsive to said energy element overtaking said time element for successively disconnecting said load increments from said circuit.

4. In combination, an electric circuit, load devices for connection thereto, a master controller having a time contact and an energy contact connected to be operated in accordance with the load on said circuit, a relay system including a plurality of sequentially operating time delayed acting relays under the control of said master controller, and individual control means for controlling the connection of said load devices to said circuit connected to be controlled respectively by the time delayed acting relays of said relay system.

5. In combination, an electric circuit, a load increment adapted to be applied to and removed from said circuit, manually actuable means for selectively controlling the application to or removal from said circuit of said load increment, a power demand controller connected to be responsive to the power demand on said circuit, and means controlled by said controller for preventing manually controlled application of said load increment to said circuit when the power demand on said circuit exceeds a predetermined value.

6. In combination, an electric circuit, a load adapted to be applied to said circuit, a push button station for giving manual control of the application and removal of said load to and from said circuit, a power-demand responsive controller connected to said circuit, and means controlled by said controller for incapacitating the part of said push button station controlling the application of said load to said circuit when during the later part of the maximum demand period the load on said circuit is so high that if it is not reduced the maximum demand for said circuit will be exceeded.

7. In combination, an electric circuit, a load increment adapted to be applied to and removed from said circuit, manually actuable means for selectively controlling the application to or removal from said circuit of said load increment, a power-demand controller connected to respond to the power demand on said circuit, means under the control of said controller for automatically applying said load increment to or removing it from said circuit depending upon whether the power demand on said circuit is below or above a predetermined value, respectively, and manually controllable means for selectively incapacitating either said manually actuable means or said means under the control of said power demand controller whereby said load increment may be selectively either entirely manually controlled or entirely automatically controlled.

8. In combination, an electric power circuit, a plurality of load increments connected thereto, control means connected to be responsive to the power flow in said circuit, and means controlled by said control means for sequentially removing said load increments from said circuit under predetermined load conditions on said circuit, said last-mentioned means including interchangeable quick detachable connections to said load increments.

RICHARD H. KAUFMANN.